(12) United States Patent
Larsen

(10) Patent No.: US 7,026,571 B2
(45) Date of Patent: Apr. 11, 2006

(54) GLASS MASKING METHOD USING LASERS

(75) Inventor: James E. Larsen, Waconia, MN (US)

(73) Assignee: Cardinal IG Company, Eden Prairie, MN (US)

( * ) Notice: Subject to any disclaimer, the term of this patent is extended or adjusted under 35 U.S.C. 154(b) by 454 days.

(21) Appl. No.: 10/248,257

(22) Filed: Dec. 31, 2002

(65) Prior Publication Data
US 2004/0123627 A1 Jul. 1, 2004

(51) Int. Cl.
B23K 26/38 (2006.01)

(52) U.S. Cl. .................. 219/121.69; 156/250; 156/267

(58) Field of Classification Search ........... 219/121.68, 219/121.69; 156/250, 267, 510, 514, 518, 156/519, 522; 65/23, 56
See application file for complete search history.

(56) References Cited

U.S. PATENT DOCUMENTS

| | | | |
|---|---|---|---|
| 1,256,818 A | 2/1918 | Nile | |
| 1,284,997 A | 11/1918 | Bigler | |
| 1,562,948 A | 11/1925 | Elliott | |
| 1,843,432 A | 2/1932 | Nickerson | |
| 2,004,878 A | 6/1935 | MacNaught | |
| 2,372,982 A | 4/1945 | Richards et al. | |
| 2,672,122 A | 3/1954 | Kupec et al. | |
| 2,817,399 A | 12/1957 | Donaldson et al. | |
| 2,917,789 A | 12/1959 | Le Bon, III | |
| 2,979,025 A | 4/1961 | Mund | |
| 3,023,464 A | 3/1962 | Zerbe | |
| 3,047,142 A | 7/1962 | Heffley | |
| 3,077,059 A | 2/1963 | Stout | |
| 3,139,352 A | 6/1964 | Coyner | |
| 3,358,355 A | 12/1967 | Youssi et al. | |
| 3,575,790 A | 4/1971 | Fleck | |
| 3,743,150 A | 7/1973 | Eckart, Jr. | |
| 3,760,860 A | 9/1973 | Kelarakis | |
| 3,837,949 A | 9/1974 | Eckart, Jr. | |
| 3,863,601 A | 2/1975 | Eckart, Jr. | |
| 3,891,486 A | 6/1975 | Willdorf | |
| 4,000,593 A | 1/1977 | Cypher | |
| 4,041,663 A | 8/1977 | Mazzoni | |
| 4,070,781 A | 1/1978 | Sauer | |
| 4,075,386 A | 2/1978 | Willdorf | |
| 4,124,965 A * | 11/1978 | Stahl ........................... 53/412 |
| 4,168,978 A | 9/1979 | Koenig | |
| 4,233,796 A | 11/1980 | Mazzoni et al. | |
| 4,235,192 A | 11/1980 | Brubaker | |
| 4,338,149 A | 7/1982 | Quaschner | |
| 4,549,063 A * | 10/1985 | Ang et al. ............. 219/121.69 |
| 4,610,115 A | 9/1986 | Thompson, Jr. | |
| 4,616,456 A | 10/1986 | Parker | |
| 4,657,796 A | 4/1987 | Musil et al. | |
| 4,822,649 A | 4/1989 | Canaud et al. | |
| 4,931,134 A | 6/1990 | Hatkevitz et al. | |
| 4,940,622 A | 7/1990 | Leavitt, Sr. et al. | |

(Continued)

FOREIGN PATENT DOCUMENTS

CA 2085109 9/1997

(Continued)

Primary Examiner—Geoffrey S. Evans
(74) Attorney, Agent, or Firm—Fredrikson & Byron, P.A.

(57) ABSTRACT

A method of making a glazing subassembly includes disposing a sheet of masking material over at least one surface of a glass panel and cutting through the masking material along a path between a central region of the pane and a peripheral region of the pane. The method may incorporate a laser to cut the masking material.

12 Claims, 5 Drawing Sheets

U.S. PATENT DOCUMENTS

| | | |
|---|---|---|
| 4,952,430 A | 8/1990 | Bowser et al. |
| 4,971,130 A | 11/1990 | Bentley |
| 4,996,808 A | 3/1991 | Weaver |
| 4,997,687 A | 3/1991 | Carter |
| 4,999,147 A | 3/1991 | Kojima et al. |
| 5,020,288 A | 6/1991 | Swensen |
| 5,049,445 A | 9/1991 | Arvidsson et al. |
| 5,107,643 A | 4/1992 | Swensen |
| 5,131,967 A | 7/1992 | Tweadey, II et al. |
| 5,201,946 A | 4/1993 | Marsek |
| 5,264,099 A | 11/1993 | Szczyrbowski et al. |
| 5,330,232 A | 7/1994 | Smith |
| 5,411,760 A | 5/1995 | Woodhall et al. |
| 5,439,716 A | 8/1995 | Larsen |
| 5,453,459 A | 9/1995 | Roberts |
| 5,468,538 A | 11/1995 | Nameche |
| 5,557,899 A | 9/1996 | Dube et al. |
| 5,599,422 A | 2/1997 | Adams, Jr. et al. |
| 5,603,190 A | 2/1997 | Sanford |
| 5,618,582 A | 4/1997 | VanWinckel |
| 5,735,089 A | 4/1998 | Smith et al. |
| 5,757,564 A | 5/1998 | Cross et al. |
| 5,761,860 A | 6/1998 | Koike et al. |
| 5,773,110 A | 6/1998 | Shields |
| 5,780,805 A * | 7/1998 | Duncan et al. ........ 219/121.68 |
| 5,836,119 A | 11/1998 | Emmanuel |
| 5,866,199 A | 2/1999 | Swidler et al. |
| 5,866,260 A | 2/1999 | Adams, Jr. et al. ......... 428/426 |
| 5,873,203 A | 2/1999 | Thiel |
| 5,935,669 A | 8/1999 | Leeuwenburgh |
| 5,992,107 A | 11/1999 | Poirier |
| 5,992,888 A | 11/1999 | North et al. |
| 6,080,261 A | 6/2000 | Popat et al. |
| 6,099,927 A | 8/2000 | Freedman |
| 6,123,361 A | 9/2000 | Cohen |
| 6,124,044 A | 9/2000 | Swidler |
| 6,129,959 A | 10/2000 | Mercer et al. |
| 6,158,483 A | 12/2000 | Trpkovski |
| 6,258,199 B1 | 7/2001 | Lingamfelter et al. |
| 6,334,631 B1 | 1/2002 | Hollander |
| 6,338,503 B1 | 1/2002 | Hollander |
| 6,352,754 B1 * | 3/2002 | Frost et al. .................. 428/77 |
| 6,364,362 B1 | 4/2002 | Severin |
| 6,375,225 B1 | 4/2002 | Lapsker |
| 6,489,024 B1 | 12/2002 | Griffith, Jr. et al. |
| 6,926,786 B1 * | 8/2005 | Frost et al. ................ 156/101 |
| 2001/0030420 A1 | 10/2001 | Zborovsky-Fenster et al. |
| 2001/0048222 A1 | 12/2001 | Mitchell |
| 2002/0043798 A1 | 4/2002 | Engel |
| 2002/0046089 A1 | 4/2002 | Zorn |
| 2003/0070391 A1 | 4/2003 | Tachauer et al. |
| 2003/0087592 A1 * | 5/2003 | Trpkovski .................... 451/65 |

FOREIGN PATENT DOCUMENTS

| | | | |
|---|---|---|---|
| DE | 196 06 395 C1 | 10/1997 | |
| DE | 297 17 810 U | 2/1999 | |
| EP | 0 807 611 A1 | 11/1997 | |
| GB | 2 033 947 A | 5/1980 | |
| GB | 2227270 A | 7/1990 | |
| GB | 2308829 A | 7/1997 | |
| JP | 2-155587 A * | 6/1990 | ............ 219/121.67 |
| WO | WO 91/19878 | 5/1991 | |
| WO | WO 00/21734 A | 4/2000 | |
| WO | WO 00/36260 A | 6/2000 | |
| WO | WO 00/77111 A2 | 12/2000 | |
| WO | WO 01/02496 | 1/2001 | |

\* cited by examiner

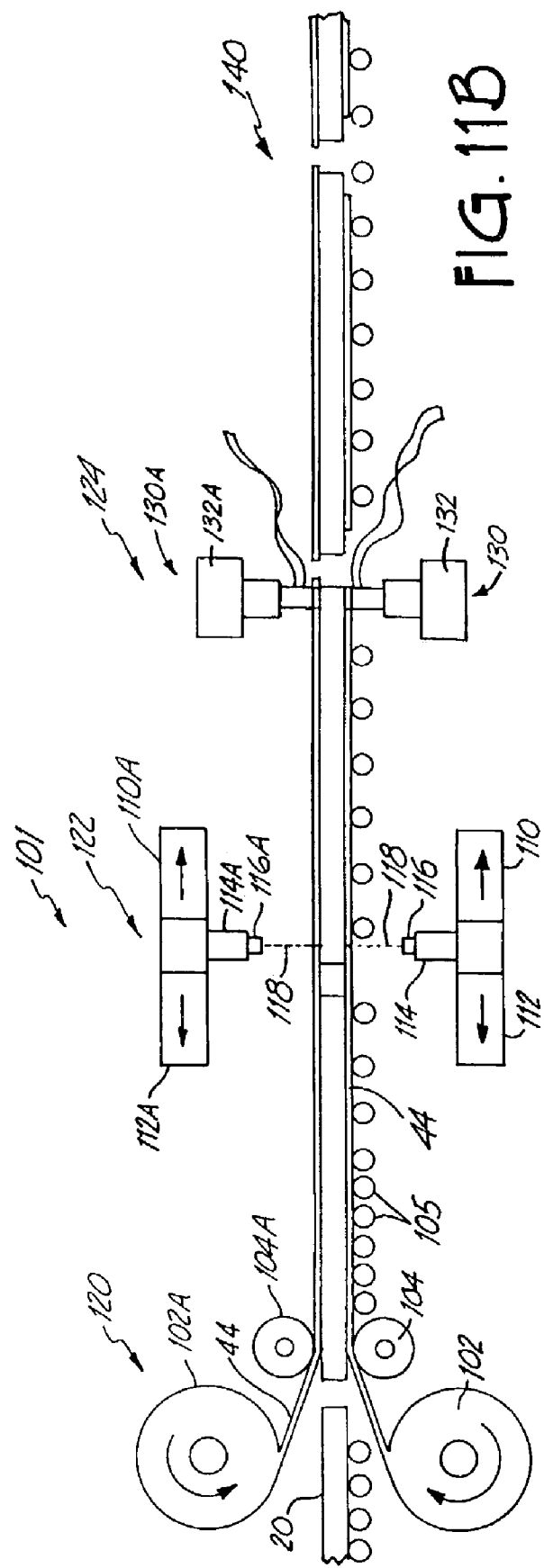

GLASS MASKING METHOD USING LASERS

BACKGROUND OF INVENTION

1. Field of the Invention

The present invention relates generally to glass windows and doors. More specifically, the present invention relates to preparing glass panels for insertion into window frames. The present invention includes methods for protecting or masking glass panes to be disposed within window frames, while leaving the peripheral region free to be better sealed within a frame.

2. Description of Related Art

Glazing panels are often mounted within frames such as window frames. The glazing panels can be single glass panes or multi-pane, insulating glass units. The window panes typically have first and second major surfaces with peripheral edges about the major surfaces, and peripheral regions within the peripheral edges. The peripheral regions bound a central region on each of the first and second major surfaces. The glass panes are typically ultimately disposed within frames, where the frames are dimensional and configured to accept only the peripheral regions of the glass panes, leaving the central regions of the window panes unoccluded. In some uses, the window panes are first formed into insulating glass units, having two or more substantially parallel window panes separated by spacers there between. In some insulating glass units, the parallel glass panes are sealed to the spacing member, and the air between the panes replaced with an inert gas. The resulting insulating glass unit can then be disposed within a window frame.

Old style windows were often made using several smaller panes of glass held within smaller frames, which were joined together into one window unit. Each portion of a double hung window might be formed of 4, 6 or 8 window panes held in place within a corresponding number of window frames. The additional frame members typically required additional glazing to secure the multiple window panes to the frame. The additional glazing represented additional labor and additional opportunities for air infiltration. Modern windows are typically formed of larger single panels, which are often insulating glass units. Some purchasers desire the older style appearance, but without the drawbacks. To achieve these goals, modern windows can have muntin bars placed over the single glass panels, to achieve the older style appearance of multiple panes, but without the disadvantages. The muntin bars thus represent another set of framing members to be disposed over the glass surface.

It is common for the glass panes and insulating glass units to be formed at one location, protected in some fashion, and shipped to another location. It is not until arrival at the second location that the glass panes or insulating glass units are mounted within window frames. Muntin bars may also be mounted at the second location. The window frames are often then shipped to a third location, where they may be installed within homes, buildings, or automobiles.

There is an opportunity for damage to the glass panes at many points in the process, including the transport to the second location prior to framing, and subsequent to framing, prior to arrival at the building site. The glass major surfaces may also be damaged after installation in the building, for example, during building construction.

For the above-stated reasons, the glass pane major surfaces are often masked, for example, with a polymeric protective film. The protective film can provide some protection from abrasion and scratches to the surface during the transport or the building construction.

Sheets of masking material may be adhered to one or more of the glass pane surfaces to protect the surfaces from the scratching previously mentioned. Often, the entire glass pane is masked on at least one major surface. The masking material may be cut to the same size as a glass pane major surface. The glass pane may then be inserted within a window frame adapted in dimension to accept the peripheral region of the glass pane within the window frame. This can be done while the masking material is in place, leaving the glass major surface protected. This method, however, can leave polymeric material trapped along the peripheral region of the glass pane, between the glass surface and the enclosing frame member. The visible polymeric remnants may be unsightly, and may eventually degrade and/or be pulled out, reducing the integrity of the seal between the glass surface and the enclosing window frame. This can leave a gap between the glass surface and the window frame.

Cutting knives have been used to mechanically cut through the polymeric masking material while the masking material is on the glass surface. The peripheral strip of masking material thus delineated from the central region masking material may be peeled off, leaving the protected central region intact. The knife blade used to cut through the polymeric material may require an undue amount of adjustment, and may not provide exactly the needed pressure to cut through the polymeric film but not into the window pane. As windows are increasingly covered with coatings, the knife edge cutting through the outermost window coating can be very undesirable. What would be desirable are methods for removing the masking material that do not requiring touching the glass pane adhered to the masking material.

SUMMARY OF INVENTION

The present invention provides methods and apparatus for masking glazing panels with a protective layer, while leaving a peripheral region near the glazing panel edges free of masking material to allow better insertion and fit into a window frame. In one method, a masking material is applied over a first major surface of a glazing panel, followed by burning through the masking material along a cutting path which can follow inside of the edges of the glazing panel, demarcating a peripheral strip of masking material. In one method, a closed path within the periphery of the glazing panel is traveled by the laser beam, thereby forming a scored path through the masking material. The peripheral strip of masking material thus formed can be removed or peeled off by a stripper or finger mechanism. The final glazing panel thus has a central region covered with masking material and a peripheral region free of masking material, ready to be closely fit within a window frame.

In one method, the masking material is sized such that a top and bottom peripheral region is free of masking material prior to cutting by the laser beam. This method requires fewer cuts through the masking material. In another method, the masking material is applied, then a muntin bar pattern is burned through the masking material. The masking material regions which are to lie under the muntin bars can be removed, and the frame and muntin bars mounted over the partially masked glass panel.

In still another method, a polymeric masking film is corona treated on one side and coated with an acrylic adhesive on the other side. The corona treated side is resistant to adhering to the adhesive, with the corona treatment obviating the need for a separate release liner. The adhesive coated masking material may be rolled up and the resulting supply roll provided to the masking line. In some methods, the adhesive force may be primarily a static electrical force.

In the glazing masking line, the masking material may be pulled from the supply rolls, and pressed against the glazing panels with applicator or pincher rolls. After application to the glass surface, a path within the periphery of the glazing panel may be described by the laser beam. In one method, a laser unit is mounted on a carriage mechanism which can travel with two degrees of freedom, to describe the desired path about the glass masked surface. In one exemplary method, the carriage mechanism has a vertical carriage mechanism mounted on a horizontal carriage mechanism. The path programmed for the carriage mechanism can vary from run to run. In another method, the laser unit remains stationary, while the laser beam is made to travel about the desired path using a movable mirror.

After a line has been scored or burned through the masking material about the periphery, the peripheral strips of masking material thus formed can be grasped by stripping or gripping fingers which can pull the peripheral strips of masking material from the glazing unit.

The present invention thus provides a rapid method for scoring the masking material, allowing precise definition of the peripheral strip size desired. The laser beam enables forming score lines through the masking material without burning the underlying glass and underlying glass coatings. The laser device, which does not physically contact the glass or masking material, is not subject to mechanical wear and will not damage the glass surface. The frequency and power of the laser beam can be selected to adequately burn through the masking material but not the underlying glass.

BRIEF DESCRIPTION OF DRAWINGS

FIG. 11B is a highly diagrammatic, top view of a two sided masking line including supply rolls, applicator rolls, carriage mounted laser cutting beam free to move in two degrees of freedom, and a gripping or peeling mechanism.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Several forms of invention have been shown and described, and other forms will now be apparent to those skilled in art. It will be understood that embodiments shown in drawings and described above are merely for illustrative purposes, and are not intended to limit scope of the invention as defined in the claims which follow.

Figure 1:
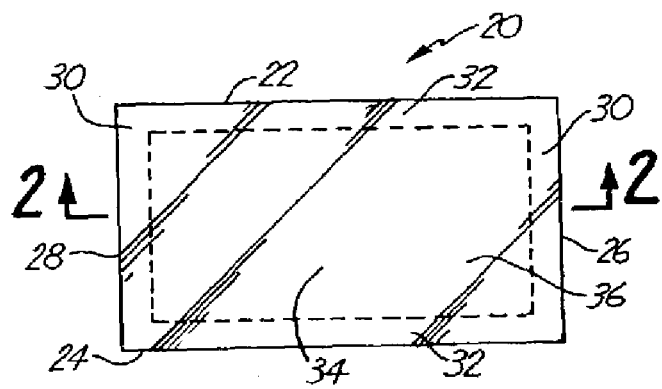
FIG. 1 is a highly diagrammatic, side view of a glazing panel to be masked where the glazing panel can be a glass pane or multi-pane insulating glass unit.
Figure 2:
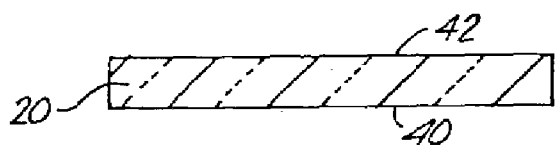
FIG. 2 is a highly diagrammatic, top view of the glazing panel of FIG. 1, prior to masking.

Referring now to FIG. 1, a glazing panel 20 is illustrated. Glazing panel 20 can be a single glass pane or an insulating glass unit including multiple glass panes separated by spacers. Glazing panel 20 includes generally a top edge 22, a bottom edge 24, a right side edge 26, and a left side edge 28. Glazing panel 20 includes generally a central region 34 surrounded by a peripheral or marginal region which includes a pair of longitudinal peripheral strips 32 and a pair of vertical or lateral peripheral strips 30. While the central and peripheral regions are described separately for purposes of illustrating the invention, the glazing panel typically is the same across the central and peripheral regions. Referring now to FIG. 2, glazing panel 20 is further illustrated from the top, having a first major surface 40 and a second major surface 42 substantially parallel to first major surface 40.

Figure 3:
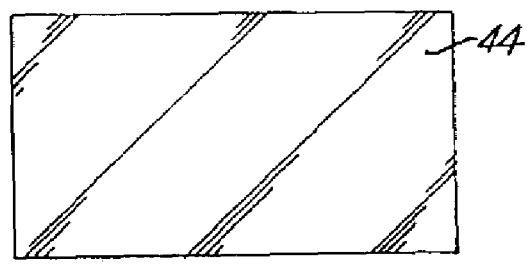
FIG. 3 is a highly diagrammatic, side view of the glazing panel of FIG. 1, after masking.

Referring now to FIG. 3, glazing panel 20 is illustrated after application of a masking material 44 over at least one of the major surfaces 40 and 42. In one method, only first major surface 40 is covered. In another embodiment, both the first and second major surfaces are covered with masking material 44.

Figure 4:
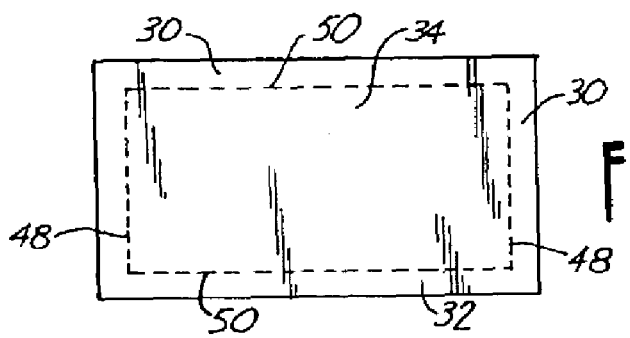
FIG. 4 is a highly diagrammatic, side view of the masked glazing panel of FIG. 3, after scoring by a laser beam about the periphery.
Figure 5:
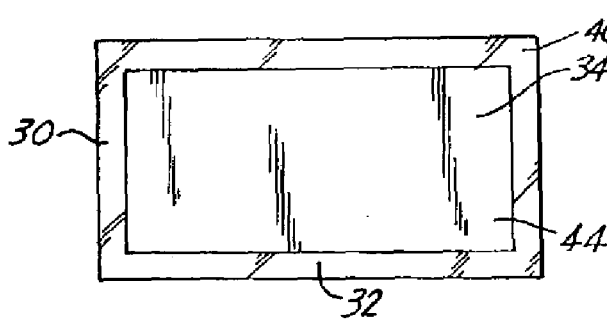
FIG. 5 is a highly diagrammatic, side view of the scored, masked, glazing panel of FIG. 4, after the peripheral masking has been peeled off.

Referring now to FIG. 4, glazing panel 20 is illustrated after the laser cutting of a closed path of score lines through the masking material, but not through the underlying glass pane. Central region 34 may be seen to be surrounded by a pair of vertical or lateral score lines 48 and a pair of longitudinal score lines 50. In a preferred embodiment, the score lines are burned entirely through the masking material in a closed path, leaving no masking material continuity between central region 34 and the surrounding peripheral regions. Referring now to FIG. 5, glazing panel 20 is illustrated after masking material 44 has been removed from peripheral regions 30 and 32, leaving masking material in central region 34.

Figure 4A:
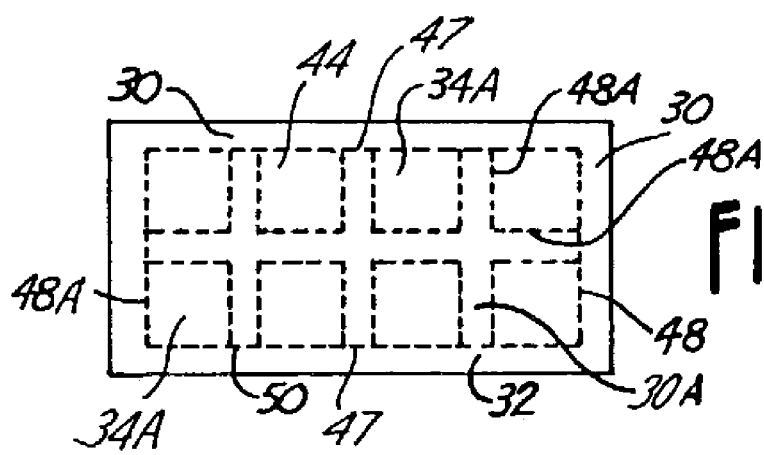
FIG. 4A is a highly diagrammatic, side view of the masked glazing panel of FIG. 3, after scoring by a laser beam in a muntin bar pattern.
Figure 5A:
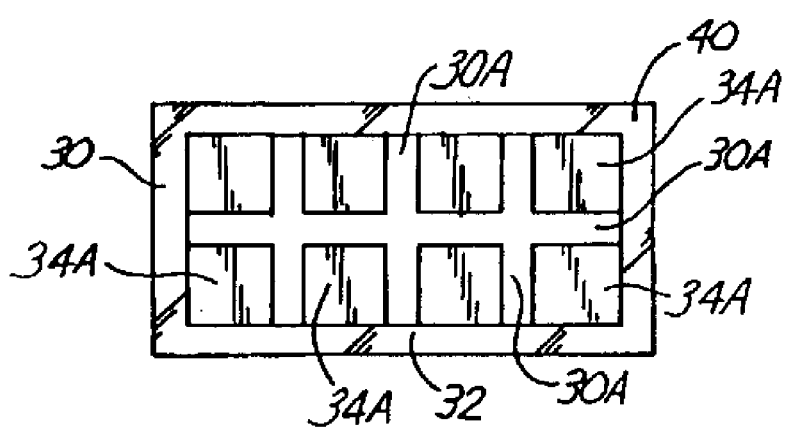
FIG. 5A is a highly diagrammatic, side view of the scored, masked, glazing panel of FIG. 4A, after the peripheral and muntin bar masking has been peeled off.

Referring now to FIGS. 4A and 5A, another embodiment of the invention is illustrated, which can be used with muntin bars. FIG. 4A illustrates a method similar to the method of FIG. 4, sharing reference numerals for similar items. In FIG. 4A, masking material 34 is illustrated after having several closed paths 48A burned through the masking material, as well as a peripheral closed path 48. In some embodiments, a separate peripheral closed path 48 does not exist, and only the numerous separate closed paths 48A are formed, which can result in a single contiguous piece of masking material requiring removal. In such an embodiment, line segments 47 are not burned through the masking material. Paths 48A may be seen to form numerous closed paths, defining corresponding central regions 34A within, and corresponding removable strips 30A without.

FIG. 5A illustrates the masked and scored glass panel of FIG. 4A, after some of masking material 44 has been removed. Central masked regions 34A may be seen to remain on the glass panel, while the masking over the removable strip areas 30A has been stripped off. At some point in the manufacture, muntin bars can be disposed over the strip portions 30A having no masking material. The masking material within each of the muntin bar faux window panes may be removed at a later time, typically after installation in a building.

Figure 6:
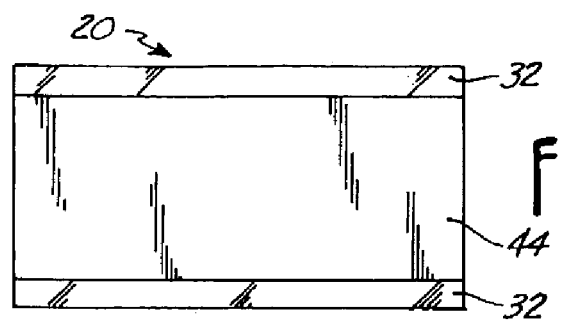
FIG. 6 is a highly diagrammatic, side view of an alternate method of masking the glazing panel of FIG. 1, leaving the top and bottom peripheral regions initially free of masking material.
Figure 7:
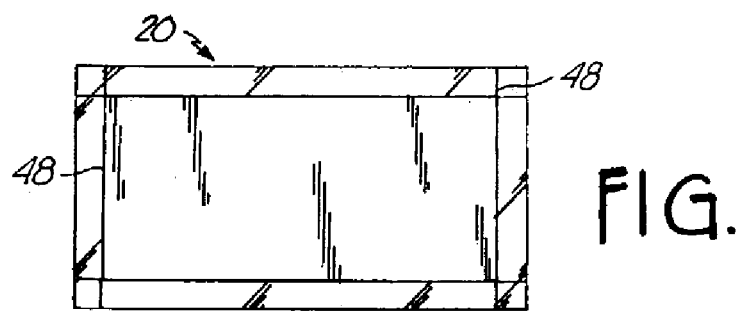
FIG. 7 is a highly diagrammatic, side view of the masked glazing panel of FIG. 6, after lateral scoring by a laser beam.

Referring now to FIG. 6, an alternate method is illustrated for applying masking material 44 to glazing panel 20. In this method, masking material 44 is sized so as to leave the glass top and bottom longitudinal peripheral strips 32 free of masking material 44. Masking material 44 may be seen to cover the central region and the lateral regions on either end. Applying masking material 44 sized in this manner reduces the cutting requirement. In some methods, the top and bottom longitudinal strips 32 are already free of masking material to a sufficient degree and do not need to be further scored or cut by the laser beam. Referring now to FIG. 7, glazing panel 20 is illustrated after lateral score lines 48 have been burned through masking material 44 by the laser beam.

Figure 8:
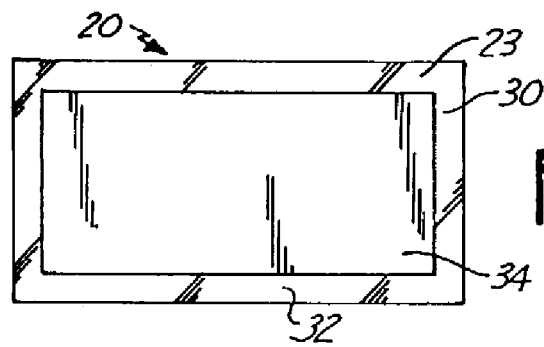
FIG. 8 is a highly diagrammatic, side view of the masked, scored, glazing panel of FIG. 7, after the lateral peripheral masking strips have been peeled off.

Referring now to FIG. 8, glazing panel 20 is illustrated after peripheral lateral masking material strips have been removed, leaving peripheral regions 30 and 32 free of masking material but leaving masking material 44 in central region 34. It may be seen that the result of utilizing the method illustrated in FIG. 6 can form a similar end result to that of FIG. 5.

Figure 9:
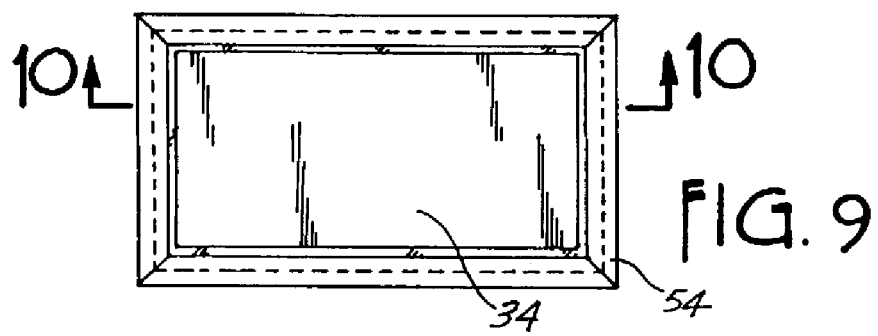
FIG. 9 is a highly diagrammatic, side view, of the masked and peeled glazing panels of FIGS. 5 or 8, after being disposed within a window frame.

Referring now to FIG. 9, further processing of the masked and stripped glazing panels of FIGS. 5 or 8 is illustrated. Glazing panel 20 has been disposed within a frame 54 about the peripheral region, leaving the central region 34 unoccluded. In embodiments having muntin bars, the muntin bars can be attached at this time, within frame 54.

Figure 10:
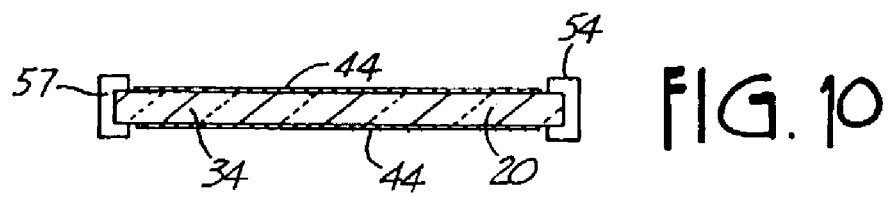
FIG. 10 is a highly diagrammatic, top, cross-sectional view of the window pane and frame of FIG. 9, illustrating the central masked portion of the finished glass unit.

FIG. 10 illustrates framed glazing panel 20 from the top, showing that central region 34 is masked by masking material 44, while the peripheral region within frame 54 is free of the masking material, thereby allowing a tighter and/or more durable fit between glazing panel 20 and frame 54.

Figure 11A:
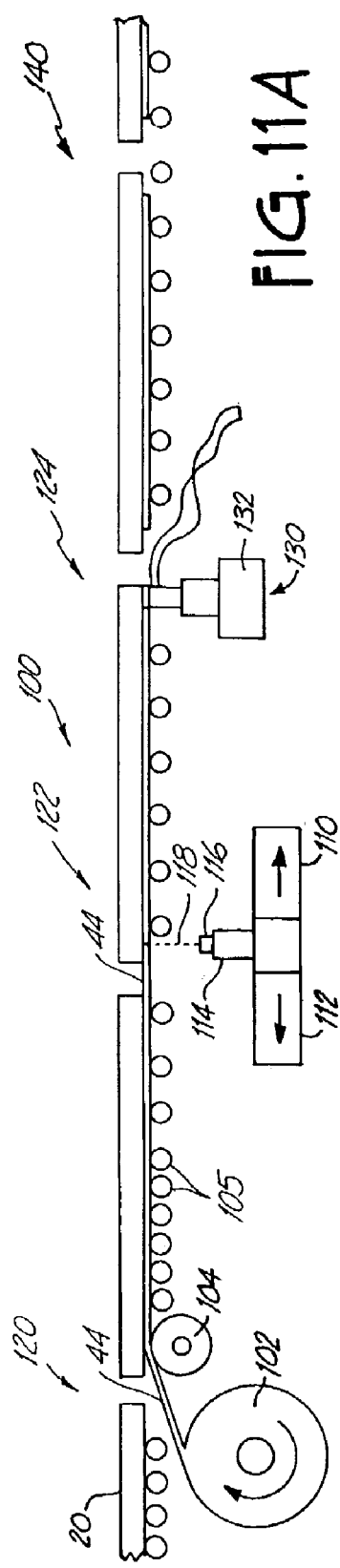
FIG. 11A is a highly diagrammatic, top view of a single sided masking line including a supply roll, applicator roll, carriage mounted laser cutting beam free to move in two degrees of freedom, and a gripping or peeling mechanism.

Referring now to FIG. 11A, a single sided glazing masking line 100 is illustrated from the top. Glazing masking line 100 includes several glazing panels 20 being processed through the line. Glazing panels 20 may be seen to be carried through the line by number of conveyor rolls 105. Glass panels 20 can pass generally through a first station 120, a second station 122, and a third station 124. First station 120 can be used to apply or adhere the masking material 44 to the glass panes 20. Second station 122 may be used to form the score lines about the periphery of the glass panes. Third station 124 may be used to strip or peel off the masked peripheral regions. In first station 126, a pair of masking material supply rolls 102 may be seen disposed on either side of glazing panels 20, being applied to glazing panel 20 by applicator or pinch rollers 104.

Second station 122 can include a carriage mechanism 110, which can include a horizontal carriage 112 and a vertical carriage 114, which can be slidably carried on horizontal carriage 112. A laser unit 116 can be carried on vertical carriage 114 and may be seen to be emitting a laser beam 118 which impinges upon masking material 44 applied to glass pane 20. In some embodiments, the horizontal and vertical carriages carry the laser 116 through a path sufficient to describe a closed, path within the edges of a glass pane, to allow later removal of the peripheral masking material. In other embodiments, a fixed laser is used, together with a mirror for sweeping the laser beam in a path about the periphery of the glass unit.

Third station 124 may be seen to include a stripper or peeler mechanism 130. In one embodiment, stripper mechanism 130 includes numerous peeler or stripper fingers 132 which are biased against glass panel 20 in order to grasp and peel off masking material 44 in the peripheral regions. In some embodiments, stripper fingers 132 extend along the vertical edge of glazing panel in order to grasp the leading edge of the lateral or vertical peripheral strip to be removed as well as the lateral top and bottom strips to be removed. The finished, masked and stripped glazing panels may be seen as indicated at 140 in FIG. 11A.

Referring now to FIG. 11B, a double sided glazing masking line 101 is illustrated from the top. Double sided line 101 can be similar to line 100 of FIG. 11A. Double sided line 101 has a second supply roll 102A, a second applicator roll 104A, a second side carriage mechanism 11A having a horizontal carriage 112A, a vertical carriage 114A, and a laser 116A. A second side stripper mechanism 130A having numerous stripper fingers 132A may also be seen. Double sided line 101 may be used when masking of both sides of a glass panel is desired.

Figure 12:
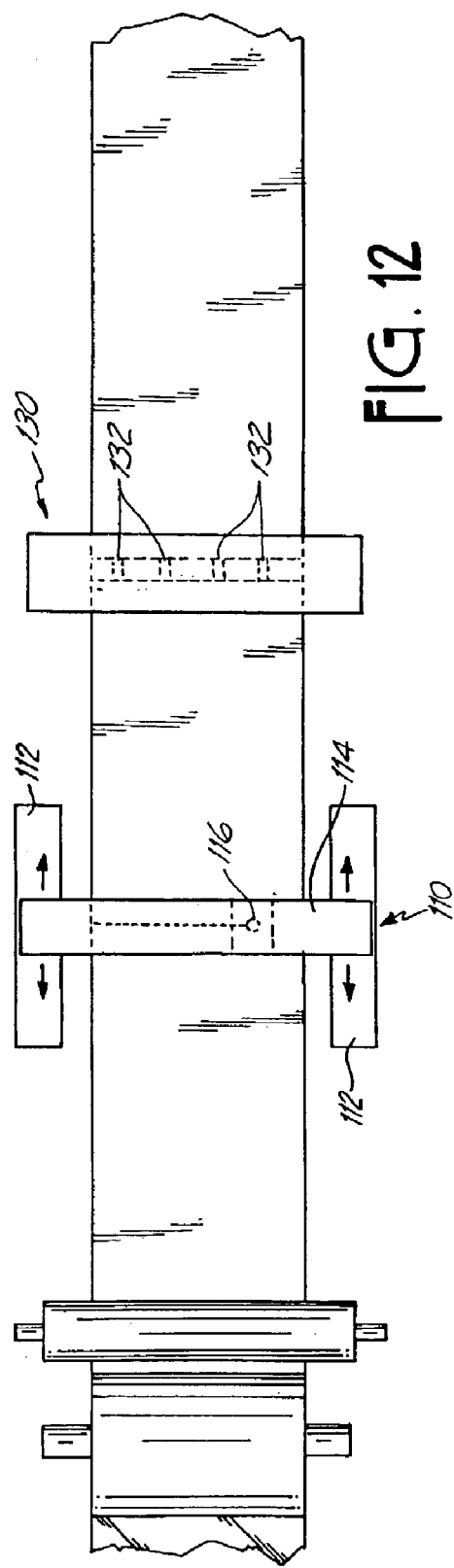
FIG. 12 is a highly diagrammatic, side view of the masking application line of FIG. 11A.

Referring now to FIG. 12, the glazing masking line 100 of FIG. 11A is illustrated from the side. A carriage mechanism 110 may be seen to include the horizontal carriage component 112 and the vertical carriage component 114 for carrying laser 116 thereon. Stripper mechanism 130 may be seen to include numerous stripper fingers 132.

In a preferred embodiment of the present invention, the path described by the laser cutting demarcates a central, masked region from a peripheral strip region which is to be removed. In one preferred embodiment of the invention, this path demarcates the central, masked region such that when the frame members and/or muntin bars are put in place over the glazing panel, the frame members and muntin bars do not overlie the central, masked region or regions. In this preferred embodiment, all peripheral edges of the central region may be disposed slightly inside of the surrounding frame members and/or muntin bars. This allows all edges of the central region to be grasped and peeled off, manually if need be. This also can provide a tight seal between the frame members and/or muntin bars, and the unmasked glazing panel directly underneath.

In another embodiment of the present invention, the path described by the laser cutting follows a path slightly inside of the region to be overlaid by the frame members and/or muntin bars. This path would thus be slightly outside of, and larger than, the path designed to have the central, masked region totally within the frame members and/or muntin bars. The central, masked region would thus be slightly overlaid by the frame members and/or muntin bars on one, some, or all peripheral edges of the central, masked region.

In one embodiment, the central, masked region is laser cut so as to have only one edge slightly underlying the overlying frame member and/or muntin bar. In another embodiment, two peripheral edges of the central, masked region are cut so as to slightly underlie the overlying frame members and/or muntin bars. The two, underlying edges may be adjacent edges, or opposing edges, depending on the embodiment. In yet another embodiment, all but one peripheral edge of the central, masked region slightly underlies the overlying frame members and/or muntin bars.

In one example of the invention, the central, masked region underlies the overlying frame members and/or muntin bars by about one millimeter, where the central, masked region is in fact underlying. In another example, the central, masked region underlies the overlying frame members and/or muntin bars by less than about two millimeters. The slightly underlying, central masked regions can provide benefits in certain situations. The slightly underlying central masked regions can provide total coverage and protection against glazing panel damage, rather than leaving a small, for example, one millimeter wide unprotected strip about the periphery of the central masked region. This total protection may be appropriate in situations where subsequent processing of the framed glazing panel may have a deleterious affect on the glazing panel. Having the central masked region slightly underlying a frame member or muntin bar along only one edge may also provide a more secure attachment of the masking material to the framed glazing panel. Allowing the central masked region to slightly underlie the framing member and/or muntin bars can also provide for a more secure attachment of the masking material to the framed glazing panel, where the adhesion of masking material to the glazing panel may otherwise be weak. This may be appropriate, for example, where the adhesion of masking material to glazing panel is intentionally weak, as when the use of adhesive is not desirable.

The slight underlying of the framing members and/or muntin bars is not believed to deleteriously affect the seal between the framing members and/or muntin bars and the underlying glazing panel, as the framing members and/or muntin bars still have a substantial surface area for direct contact to the underlying unmasked glazing panel. In one example, the framing member may be at least about three centimeters wide, providing more than sufficient width to allow a one or two millimeter wide inside peripheral strip of underlying masking material between the framing member and the underlying glazing panel. Thus, the great majority of the framing member may still directly contact the underlying glazing panel. In another example, a muntin bar may be about ten or fifteen millimeters in width, such that a one millimeter wide strip on either side of the muntin bar may still leave about 80% of the muntin bar to directly contact the underlying unmasked glazing panel. Allowing a slight underlying of the central masked region may thus provide many of the advantages of the present invention, while allowing the central masked region to be totally removed, by pulling the underlying peripheral regions out from under the overlying frame members and muntin bars at the time of masking material removal.

A variety of masking materials are suitable for use with the present invention. The masking material is preferably a polymeric film material which is sufficiently clear to allow viewing the glass through the masking material. Opaque masking materials, for example, paper are also believed suitable for use with the present invention. In some embodiments, polymeric film material is applied having a paper release liner there over, where the release liner can be removed from the central region of the glazing panel prior to removing the polymeric masking material.

Polyolefin films, for example, polyester or polyethylene, may be used to practice the present invention. In one method, a polyester film is used, well known to those skilled in the art. The polyester film may be supplied in a roll having an adhesive applied to one surface of the masking material and the other side of the polymeric masking material having a treated surface that resists adhesion to the adhesive. In some embodiments, a release liner is provided over the adhesive to prevent adhesion between the adhesive and the backside of the polymeric masking film. In one embodiment, the polyester film is roll coated with an acrylic adhesive, where the polyester film has been treated with a corona or UV treatment to prevent the acrylic adhesive from adhering or sticking to the polyester film surface. The masking material should be selected such that the material absorbs the laser beam in the laser wavelength utilized. Alternatively, the laser beam wavelength is selected to be absorbed by the masking material provided.

Various lasers may be used with the present invention. In one method, a 20 watt laser is utilized at approximately 4% power and a travel speed or burn speed of 9 inches per second. In another embodiment, a 10 watt laser is used and is operated at a minimum 8% power. In yet another embodiment, a 20 watt laser is operated at between 4% and 15% power. When using a 10 watt laser, the power range can be between 8% and 30% of full power.

The invention claimed is:

1. A method of making a glazing subassembly, the method comprising:
    providing a glass panel having first and second major surfaces;
    providing a sheet of masking material;
    disposing the sheet of masking material over the glass panel first surface; and
    cutting a plurality of rectangular closed paths through the masking material with a laser beam, each closed path defining a central region disposed within a peripheral region.

2. A method as in claim 1, further comprising removing the masking material from the peripheral region while leaving the masking material in the central region.

3. A method as in claim 1, further comprising removing the masking material along the closed paths, leaving the masking material to remain in the central regions.

4. A method as in claim 3, further comprising providing and disposing muntin bars over at least some of the remaining masking material.

5. A method as in claim 1, wherein the glass panel has edges having a peripheral zone within the edges, and a central zone within the peripheral zone, wherein the cutting step forms a peripheral closed path between the peripheral zone and the central zone.

6. A method as in claim 5, further comprising removing the masking material from the peripheral zone, leaving the masking material to remain in the central zone.

7. A method of making a glazing subassembly, the method comprising:
    providing a glass pane including first and second major surfaces, each of the first and second major surfaces having a central region and a peripheral region;
    disposing over the first surface of the glass pane a sheet of masking material dimensioned to cover the central region and at least a portion of the peripheral region;
    cutting through the masking material along a path between the central region and the covered portion of the peripheral region, so as to form a peripheral masking material strip;
    removing the peripheral masking material strip while leaving the central region covered; and
    disposing the glass pane within a frame such that at least part of the frame overlies an edge of the masking material that covers the central region.

8. A method as in claim 7, wherein the edge of the masking material overlaid by the frame has a width of less than about 2 millimeters.

9. The method as in claim 7, wherein the sheet of masking material is further dimensioned to leave a pair of opposing portions of the peripheral region of the first surface of the glass pane free of masking material when the sheet is disposed over the first surface of the glass pane.

10. A method of making a glazing subassembly, the method comprising:

providing a glass panel having first and second major surfaces;

providing a sheet of masking material;

disposing the sheet of masking material over the glass panel first surface; and cutting a plurality of closed paths through the masking material with a laser beam, each closed path defining a central region disposed within a peripheral region.

11. A method as in claim 10, further comprising removing the masking material from each of the peripheral regions defined by the plurality of closed paths.

12. A method as in claim 11, further comprising disposing at least one muntin bar over at least one of the peripheral regions.

* * * * *